United States Patent [19]

Bethel

[11] Patent Number: 4,837,966
[45] Date of Patent: Jun. 13, 1989

[54] CAM ACTION FISHING SINKER DEVICE

[76] Inventor: Bob J. Bethel, 308 Triangle Ranch Rd., Trinidad, Tex. 75163

[21] Appl. No.: 114,513

[22] Filed: Oct. 30, 1987

[51] Int. Cl.⁴ .............................................. A01K 95/00
[52] U.S. Cl. ..................................... 43/43.1; 43/44.9; 43/44.97
[58] Field of Search ................... 43/43.1, 43.15, 44.81, 43/44.9, 44.87, 44.97

[56] References Cited

U.S. PATENT DOCUMENTS

| | | | |
|---|---|---|---|
| 2,573,981 | 11/1951 | Nelson | 43/43.1 |
| 2,577,549 | 12/1951 | Vice | 43/44.97 |
| 2,630,650 | 3/1953 | Parker | 43/44.97 |
| 3,888,036 | 6/1975 | Wallace | 43/44.97 |
| 4,528,771 | 7/1985 | Rea | 43/44.9 |

FOREIGN PATENT DOCUMENTS

| | | | |
|---|---|---|---|
| 3005623 | 8/1981 | Fed. Rep. of Germany | 43/44.97 |
| 249697 | 5/1926 | Italy | 43/43.1 |

Primary Examiner—Gene P. Crosby
Attorney, Agent, or Firm—Ronald B. Sefrna

[57] ABSTRACT

The invention comprises an improved fishing sinker device which includes an elongate flattened body having a central longitudinal aperture to slideably receive a fishing line therethrough, and a slot-like aperture at one end of the body of the sinker to receive and releaseably retain the eye and shaft of a fishing hook used in conjunction with the sinker device of the invention. The elongate flattened configuration of the sinker device provides a cam action to properly position a fishing hook retained in the slot-like aperture of the sinker for setting the point of the hook in the mouth of a fish, and the retention of the hook within the slot-like aperture of the sinker will be released upon attempts by a fish to throw the hook, removing the weight of the sinker from the hook and reducing the probability of withdrawal of the hook from the mouth of the fish.

17 Claims, 2 Drawing Sheets

CAM ACTION FISHING SINKER DEVICE

BACKGROUND OF THE INVENTION

The general use of sinker devices in fishing with hook and line has been practiced for many years, and it has become increasingly common to employ specialized sinker designs in certain specific fishing situations. One such situation is the use of plastic or natural worms as bait with a fishing technique known as jigging, in which a sinker device is placed in proximity to the baited hook and used to sink the baited hook to the bottom of the body of water being fished. In this fishing technique it is desirable to maintain a particular orientation between sinker and hook, and combined sinker and hook devices sometimes referred to as jig heads have been employed to positively maintain that orientation. Although jig heads, exemplified by designs offered for sale through the 1986 "Bass Pro Shops" catalogue, and other sinker designs which firmly attach the sinker to the fishing hook or to the fishing line in immediate proximity to the hook, are effective in maintaining the desired orientation of the hook and bait above the bottom of the body of water, they suffer from several disadvantages. One such disadvantage is the fact that the sinker or sinker portion of the jig head will often wedge open the mouth of a fish which has taken the baited hook, allowing the hook to slide from the mouth of the fish when the fisherman attempts to set it. Another disadvantage is the inability to release the relatively heavy sinker from the hook after setting of the hook in the mouth of the fish, with the result that the sinker portion adds momentum and leverage to the efforts of the fish to throw or dislodge the hook from its mouth.

One approach to the solution of these disadvantages which has been attempted is to provide a sinker which slides freely along the fishing line, as illustrated by U.S. Pat. No. 3,803,749 to Boyum and by U.S. Pat. No. 4,649,663 to Strickland. While these designs have been effective in eliminating the hook throwing leverage of a fixed sinker, their effectiveness in preventing the wedging open of the mouth of the fish is much less evident. In addition, neither design is particularly useful in positioning the hook within the mouth of the fish to aid in the setting of the hook by the fisherman.

It is an object of the present invention to provide a sinker device which not only overcomes the disadvantages of wedging and hook throwing leverage, but also to provide a sinker design which aids in properly positioning the hook within the mouth of the fish for successfully setting such hook.

FIELD OF THE INVENTION

The present invention generally relates to fishing sinker devices, and more specifically relates to sliding sinker devices adapted to be releaseably interconnected to a fishing hook and configured to provide a cam action for positioning the hook within the mouth of a fish for most effective setting of such hook.

SUMMARY OF THE INVENTION

The present invention provides a fishing sinker device comprising an elongate flattened body having a central longitudinal aperture to sildeably receive a fishing line therethrough, and a slot-like aperture extending into said body from one end thereof to receive the eye and a part of the shaft of a fishing hook attached to such fishing line. In the preferred embodiment, the device of the invention is constructed of lead or a soft lead alloy to provide suitable weight without excessive size and to allow deformation of the slot-like aperture for the purpose of adjusting the tension retaining the fishing hook therein. In an alternative embodiment the slot-like aperture of the sinker device is lined with a resilient rubber or rubber-like material to retain the fishing hook while substantially reducing abrasion of the fishing line attached thereto.

The width of the body of the sinker device gradually increases from a slightly rounded point at a first end to a maximum value near the longitudinal mid-point of the sinker, decreases gradually to a point approximately three-fourths of the length of the sinker from its first end, and then remains constant to a second end of the sinker to form a shank portion surrounding the slot-like aperture extending from such second end into the interior of the sinker. The thickness of the body of the sinker increases from a point at such first end to a maximum value and remains essentially constant over the majority of the length of the sinker to its second end, such that the shape of the body of the sinker device resembles that of an arrowhead.

In use, a fishing line is inserted through the central longitudinal aperture of the sinker from its first end, and a fishing hook is attached to the fishing line. The sinker device is then slid along the fishing line toward the hook and the eye and a part of the shaft of the hook are inserted into the slot-like aperture extending into the body of the sinker from its second end. The shaft portion of the body of the sinker device may be compressed against the eye and shaft of the hook with the desired tension to retain the hook within said slot-like aperture, rendering the sinker device and related hook and line ready for use. The sinker device may alternatively be used in the manner of a conventional sliding sinker, without retention of the fishing hook within the slot-like aperture of the sinker. In either manner of use, the sinker device of the invention will, if taken into the mouth of a fish striking the fishing hook, provide a cam action within the mouth of the fish to properly position the hook for setting by the fisherman.

DETAILED DESCRIPTION OF THE INVENTION

Figure 1:
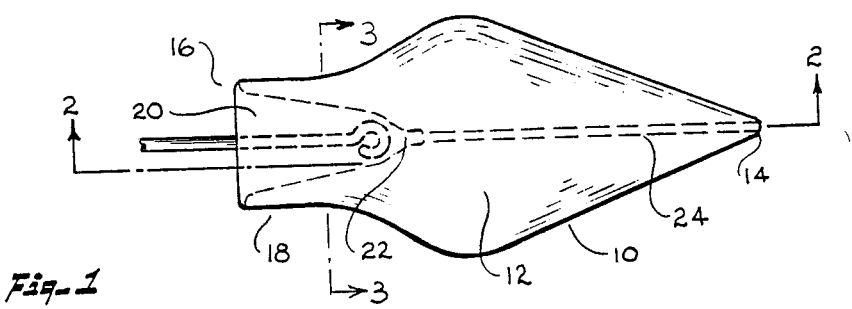
FIG. 1 is a plan view of the preferred embodiment of the sinker device of the invention, with a partial view of a fishing hook inserted into the sinker.
Figure 2:
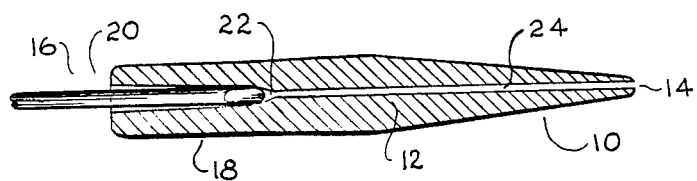
FIG. 2 is a cross-sectional elevation view of the preferred embodiment of the sinker device of the invention, with a partial view of a fishing hook inserted into the sinker, along line 2—2 of FIG. 1.
Figure 3:
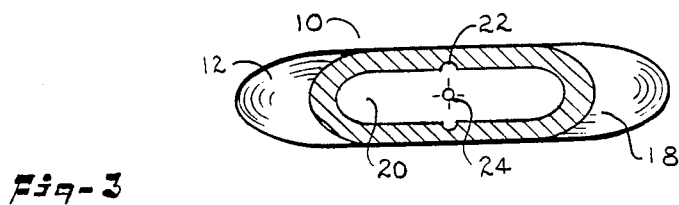
FIG. 3 is a cross-sectional end elevation view of the preferred embodiment of the sinker device of the invention, along line 3—3 of FIG. 1.

Referring now to the accompanying drawing figures, especially FIG. 1 and FIG. 2, the sinker device of the invention, identified by reference number 10, comprises an elongate flattened unitary body 12 having a central longitudinal axis. The width of body 12 of sinker 10 increases gradually from a point at a first end 14 to a maximum value near the longitudinal midpoint of body 12, then decreases gradually over approximately half the distance from such longitudinal midpoint toward a second end 16 of body 12, and then remains essentially constant over the remainder of the length of body 12. The thickness of body 12 is substantially constant over the majority of the length of body 12 from second end 16 toward first end 14, and then tapers to a point at first end 14. From the foregoing description, it will be apparent that sinker 10 is generally configured in the shape of an arrowhead, having a short shank portion 18 opposite its point at first end 14. Such arrowhead shape is useful in avoiding snagging of sinker 10 in weeds or other underwater obstructions, in stabilizing the path of sinker 10 and associated baited hook as they are drawn through the water, and in properly orienting the associated baited hook upon the bottom of a body of water in bottom or jig fishing. The principal advantage of the flattened arrowhead shape of body 12, however, is its cam action in the mouth of a fish during the efforts of a fisherman to set the associated hook therein, described in detail hereinbelow.

Figure 4:
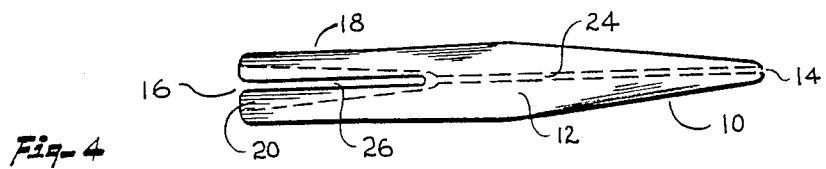
FIG. 4 is a side elevation view of the preferred embodiment of the sinker device of the invention, with optional split shank.

Sinker 10 further includes a slot-like aperture 20 extending into the interior of body 12 from its second end 16 to receive the eye and a part of the shaft of a fishing hook to be used in association with sinker 10. Aperture 20 decreases in both height and width from second end 16 toward the interior of body 12 to aid in centering a fishing hook therein. The height of aperture 20 at second end 16 of body 12 should, however, be less than the largest dimension of the eye of the fishing hook to be used with sinker 10, to aid in the positioning of the eye of the fishing hook relative to aperture 20 during use of the sinker. In the preferred embodiment of sinker 10, body 12 also includes a groove-like aperture 22 extending into the upper and lower surfaces of shank 18 from aperture 20 and farther into the interior of body 12 from the inner end of aperture 20, to receive the knot formed in the fishing line around the eye of the fishing hook used with sinker 10 and prevent excessive abrasion thereof. Body 12 is additionally penetrated by central aperture 24 to receive a fishing line to be passed through sinker 10 and tied to the eye of the fishing hook to be used therewith. The end of aperture 24 coincident with first end 14 of body 12 is preferably slightly flared and smooth to avoid abrasion of the fishing line extending therethrough. Apertures 20, 22, and 24, all in coaxial alignment with the longitudinal axis of body 12, form a continuous passageway through the interior of sinker 10. Although in the preferred embodiment of sinker 10 shank portion 18 of body 12 fully surrounds aperture 20, the upper and lower halves of shank 18 may be optionally separated by slits 26 as depicted in FIG. 4, to aid in compressing shank 18 firmly against the eye and shaft of the fishing hook received in aperture 20.

Figure 5:
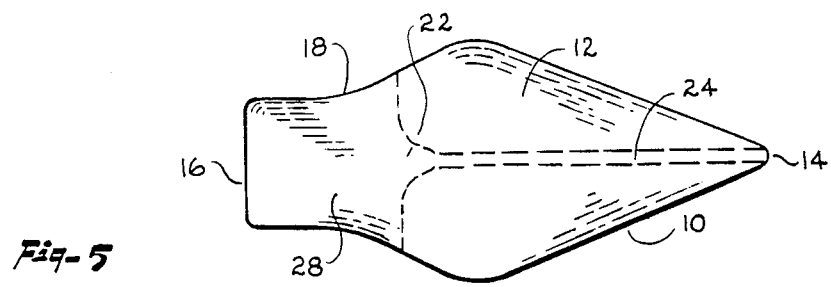
FIG. 5 is a plan view of a first alternative embodiment of the sinker device of the invention.
Figure 6:
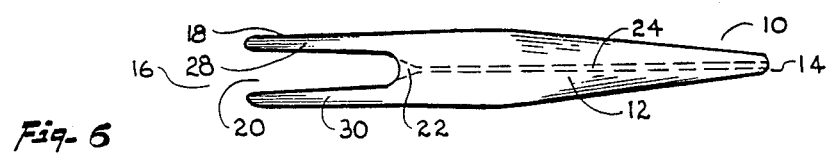
FIG. 6 is a side elevation view of a first alternative embodiment of the sinker device of the invention.

It will be readily understood that the preferred embodiment of sinker 10, illustrated in FIG. 1 and FIG. 2, is susceptible to various modifications and alternative embodiments without departing from the spirit of the invention. In a first alternative embodiment, depicted in FIG. 5 and FIG. 6, aperture 20 extends through the edges of shank 18 to form an open slot and divide shank 18 into upper and lower tabs 28 and 30 respectively. With the first alternative embodiment it will be somewhat easier for a fisherman to bend shank 18 of sinker 10 away from alignment with the longitudinal axis of sinker 10 for the purpose of elevating a baited hook above the bottom of a body of water during bottom or jig fishing while still retaining the eye and shaft of a fishing hook firmly in aperture 20.

Figure 7:
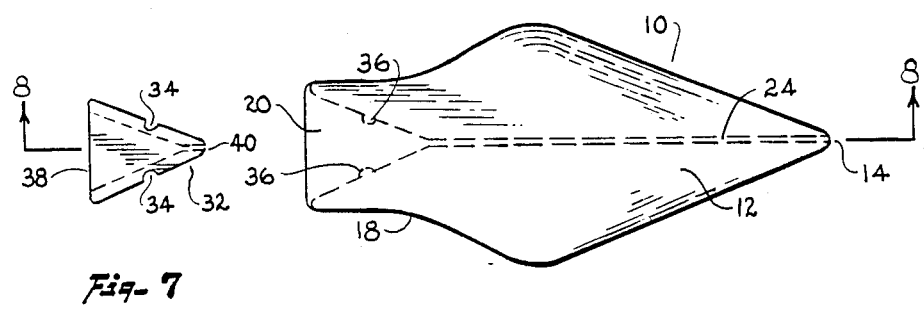
FIG. 7 is an exploded plan view of a second alternative embodiment of the sinker device of the invention.
Figure 8:
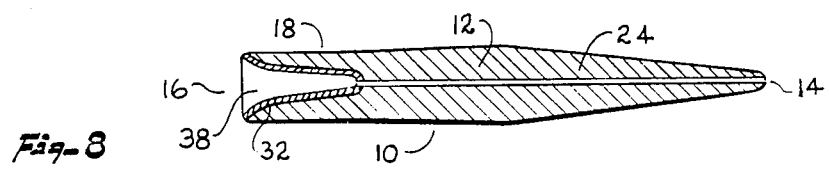
FIG. 8 is a cross-sectional elevation view of a second alternative embodiment of the sinker device of the invention along line 8—8 of FIG. 7.

In a second alternative embodiment of sinker 10, illustrated in FIG. 7 and FIG. 8, aperture 20 is fitted with a resilient insert 32 of rubber or rubber-like material to aid in the retention of the eye and shaft of a fishing hook therein while reducing abrasion of the fishing line tied to the eye of the fishing hook. Insert 32 is configured to fit firmly within aperture 20 in interconnection therewith, and is provided with a plurality of depressions 34 in its outer surface to mate with a plurality of studs 36 extending into aperture 20 from the inner surface of shank 18 to aid in the retention of insert 32 within aperture 20. Insert 32 includes aperture 38 extending into the interior thereof to receive the eye and part of the shaft of the fishing hook to be inserted therein. As illustrated in FIG. 8, the height of aperture 38 decreases rapidly from the outer end of insert 32 toward the interior of body 12, for the purpose of frictionally retaining the fishing hook therein without the necessity of deforming shank 18 of the sinker 10. Insert 32 additionally includes aperture 40 to continue the passageway formed by aperture 24 through insert 32 into aperture 38 for the passage of fishing line therethrough.

In the preferred embodiment of the device of the invention, and in the first and second alternative embodiments thereof, body 12 is preferably formed of lead or of a malleable lead alloy in order to provide suitable weight to sinker 10 and to allow shank 18 to be deformed as appropriate to frictionally retain a fishing hook. Body 12 may, however, be formed of other metallic material, or of a non-metallic material, having suitable properties for use of sinker 10 as described. Body 12 of sinker 10 may also be painted or coated if desired without departing from the scope of the invention.

In using the sinker device of the invention, described in terms of the preferred embodiment, a fishing line is inserted through apertures 24, 22, and 20 of body 12 from its first end 14 and attached to the eye of a fishing hook to be used with sinker 10. Sinker 10 is then slid along such fishing line until the eye and a part of the shaft of the fishing hook are fully received within aperture 20, with the knot formed in the fishing line received within aperture 22, and shank 18 is compressed as needed to firmly retain the fishing hook in interconnection with sinker 10. When so interconnected, the plane of the curvature of the fishing hook will be perpendicular to the plane of body 12 of sinker 10. If desired by the fisherman, shank 18 may be bent away from alignment with the longitudinal axis of body 12 to alter the configuration of the interconnected sinker 10 and fishing hook. The fishing hook is baited, and the interconnected sinker and baited hook are placed into the water. It may be desired, in some fishing situations or by some fisherman, to use sinker 10 as a sliding sinker, without retention of the fishing hook in aperture 20, and the sinker device of the invention is readily adaptable to and advantageous in such use.

When the bait is taken by a fish sinker 10 will, in most cases, be taken into the mouth of the fish along with the baited hook. As the fisherman exerts pressure on the fishing line to set the hook, sinker 10 will be generally be withdrawn from the closed jaws of the fish. Regardless of the initial position of sinker 10 relative to the mouth of the fish when first taken therein, as the mouth of the fish is closed and sinker 10 is withdrawn therefrom the flattened shape of sinker 10 will cause body 12 to function as a cam, forcing the plane of body 12 into alignment with the plane of the jaws of the fish, thus placing the plane of curvature of the fishing hook perpendicular to the plane of the jaws of the fish and maximizing the probability of penetration of the point of the fishing hook into the body of the fish.

If sinker 10 has been rigged by the fisherman as a sliding sinker, and sinker 10 is taken into the mouth of the fish along with the baited hook, the design of sinker 10 will still allow it to provide a cam action to facilitate setting of the fishing hook in the mouth of the fish. As the mouth of the fish closes upon sinker 10, body 12 will function as a cam, forcing the plane of body 12 into alignment with the plane of the jaws of the fish. Then, as the fisherman forcefully pulls the fishing line to set the fishing hook, the fishing line will slide through the passageway in body 12, drawing the eye of the fishing hook into contact with second end 16 of body 12. Since the height of the aperture from end 16 into the interior of shank 18, aperture 20 in the preferred embodiment, is less than the largest dimension of the eye of the fishing hook, as the fisherman continues to pull the fishing line the eye of the fishing hook will be drawn against said end 16 and will function as a cam, causing a rotation of the fishing hook about the longitudinal axis of its shaft until the eye of the fishing hook is brought into alignment with and is able to slide into aperture 20. Through such rotation of the fishing hook, the plane of curvature of the hook is brought toward a position perpendicular to the plane of the jaws of the fish and the point of the hook is moved toward the optimum position for penetration into the mouth of the fish.

When the hooked fish begins to fight the hook and pressure of the fishing line, typically throwing its head from side to side, the frictionally retained interconnection between the fishing hook and sinker 10 will be released, and sinker 10 will freely slide along the fishing line away from the fishing hook. Such release of sinker 10 eliminates the leverage and momentum associated with a sinker firmly interconnected to the fishing line in proximity to the hook or integral with the hook, and substantially reduces the probability that the fish will successfully throw the hook from its mouth.

The foregoing detailed description of the preferred embodiment of the invention and of certain alternative embodiments of the invention is intended to be illustrative and not limiting. The device of the invention is susceptible to various adaptations and modifications beyond those described without departing from the scope and spirit of the invention as claimed.

What is claimed is:
1. A fishing sinker device comprising:
an elongate flattened body having first and second ends, said body gradually increasing in width from its first end toward its second end, and gradually increasing in thickness from its first end toward its second end;
a shank having first and second ends, interconnected at its first end to the second end of said body in coaxial alignment therewith;
a slot-like aperture extending into the interior of said shank from the second end thereof in coaxial alignment with said shank and lying generally in the same plane as said body, to receive the eye and a portion of the shaft of a fishing hook to be inserted therein; and
an elongate aperture penetrating said body along its longitudinal axis from said first end of said body through the interior thereof to said second end, and connecting with said slot-like aperture in coaxial alignment therewith to form a continuous passageway through said body and through said shank to receive a fishing line therethrough.
2. The fishing sinker device of claim 1, wherein said shank is integrally formed with said body.
3. The fishing sinker device of claim 1, wherein the height of said slot-like aperture at the second end of said shank is less than the largest dimension of the eye of a fishing hook to be received therein measured perpendicular to the longitudinal axis of the shaft of such fishing hook, and the height of said slot-like aperture decreases from the second end of said shank toward the interior thereof to a minimum dimension at the end of said aperture opposite said second end of said shank which is substantially equal to the cross-sectional dimension of the shaft of said fishing hook.
4. The fishing sinker device of claim 1, further including a pair of opposed grooves each extending into the interior of said shank from said slot-like aperture a short distance in a direction perpendicular to the plane of said slot-like aperture, and longitudinally extending from the intersection of said elongate aperture with said slot-like aperture toward said second end of said shank.
5. A sliding fishing sinker device comprising:
an elongate substantially planar body having a first end and a second end, said body gradually increasing in width from a point at its first end to a maximum width intermediate said first and second ends, and then decreasing slightly in width toward said second end, and said body increasing slightly in thickness from said first end to said second end;
a flattened shank having a first end and a second end, interconnected at its first end to said second end of said body in coaxial alignment therewith, and open at its second end;
a slot-like aperture to receive and releaseably retain the eye and a portion of the shaft of a fishing hook, extending into the interior of said shank, in the plane of said body, from its open second end in coaxial alignment with the longitudinal axis of said shank, said aperture being of greater width than height at said second end of said shank and gradually decreasing in both width and height from said second end of said shank toward the first end of said shank;
an elongate aperture extending from said first end of said body through the interior thereof in coaxial alignment with the longitudinal axis of said body and continuing through said shank to connect with said slot-like aperture and form a continuous central passageway through the interior of the fishing sinker device to receive a fishing line therethrough in sliding relation therewith.
6. The fishing sinker device of claim 5, further including a second slot-like aperture disposed in the interior of said shank extending from the inner end of the first slot-like aperture in coaxial alignment therewith both toward said first end of said shank and toward said second end of said shank with the plane of said second slot-like aperture perpendicular to the plane of the first slot-like aperture, said second slot-like aperture narrowing in the plane thereof to smoothly interconnect with said elongate aperture extending through said body of the fishing sinker device.

7. The fishing sinker device of claim 5, wherein said body and said shank are integrally formed of a readily maleable metallic material.

8. The fishing sinker device of claim 5, wherein said body and said shank are integrally formed of lead or a soft lead alloy.

9. The fishing sinker device of claim 5, wherein the height of said slot-like aperture at said second end of said shank is less than the outside diameter of the eye of the fishing hook to be received therein, and the height of said slot-like aperture at its end opposite said second end of said shank is substantially equal to the cross-sectional diameter of the shaft of the fishing hook to be received therein.

10. The fishing sinker device of claim 5, wherein the cross-sectional configuration of said elongate aperture is smoothly rounded to prevent abrasion of the fishing line to be received therethrough, and the least cross-sectional dimension of said elongate aperture is sufficiently greater than the cross-sectional diameter of the fishing line to be received therethrough to allow said fishing line to freely slide through said elongate aperture.

11. The fishing sinker device of claim 5, further comprising a hollow thin-walled insert of resilient material disposed within said slot-like aperture and firmly interconnected to said shank within said slot-like aperture, the wall of said insert being penetrated at its end opposite said second end of said shank with an aperture in alignment with said elongate aperture of said body.

12. The fishing sinker device of claim 5, wherein said shank is split into upper and lower parts by a pair of opposing slits, each extending from the outer surface of said shank in the plane of said slot-like aperture to interconnect with said slot-like aperture in the interior of said shank.

13. A cam-action sliding fishing sinker device comprising:

an elongate substantially planar body having a first end and a second end and being of substantially greater width than thickness, said body narrowing in width from its maximum width to a point at said first end and increasing in thickness from said first end toward said second end;

a pair of substantially planar opposed tabs extending rearwardly from said second end of said body with the longitudinal axes of said tabs parallel to the longitudinal axis of said body and with said tabs being mutually parallel with the plane of said body, said tabs defining a slot therebetween to receive and releaseably retain the eye and a portion of the shaft of a fishing hook therein;

a concave aperture extending into the interior of said body from its second end between said tabs in coaxial alignment with the longitudinal axis of said body, to receive the eye of a fishing hook in nested relationship therewith; and an elongate aperture extending through said body in coaxial alignment with the longitudinal axis of said body and connecting with said concave aperture in coaxial alignment therewith to form a continuous central passageway through said body to receive a fishing line in freely sliding relationship.

14. The fishing sinker device of claim 13, wherein the height of said slot between said tabs is less than the outside diameter of the eye of the fishing hook to be received therein and is slightly greater than the cross-sectional diameter of the shaft of the fishing hook to be received therein.

15. The fishing sinker device of claim 13, wherein said device is formed as a one piece construction of a readily maleable metallic material consisting essentially of lead.

16. The fishing sinker device of claim 13, wherein said elongate aperture is smoothly rounded in cross-section.

17. The fishing sinker device of claim 13, wherein the height of said concave aperture is slightly greater than the cross-sectional diameter of the shaft forming the eye of the fishing hook to be received therein so as to avoid abrasion of fishing line attached to said eye.

* * * * *